US010205600B2

(12) United States Patent
Persson et al.

(10) Patent No.: US 10,205,600 B2
(45) Date of Patent: Feb. 12, 2019

(54) MANAGING METERING FOR DISTRIBUTED IOT APPLICATIONS

(71) Applicant: Telefonaktiebolaget L M Ericsson (publ), Stockholm (SE)

(72) Inventors: Per Persson, Sodra Sandby (SE); Ola Angelsmark, Ystad (SE); Joakim Persson, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 62 days.

(21) Appl. No.: 14/905,038

(22) PCT Filed: Nov. 3, 2015

(86) PCT No.: PCT/EP2015/075536
§ 371 (c)(1),
(2) Date: Jan. 14, 2016

(87) PCT Pub. No.: WO2017/076426
PCT Pub. Date: May 11, 2017

(65) Prior Publication Data
US 2017/0257223 A1 Sep. 7, 2017

(51) Int. Cl.
*G06F 15/16* (2006.01)
*H04L 12/14* (2006.01)
(Continued)

(52) U.S. Cl.
CPC .......... *H04L 12/14* (2013.01); *G06F 11/3438* (2013.01); *H04L 12/1432* (2013.01);
(Continued)

(58) Field of Classification Search
None
See application file for complete search history.

(56) References Cited

U.S. PATENT DOCUMENTS

| | | | | |
|---|---|---|---|---|
| 2013/0219057 A1* | 8/2013 | Li | ............................ | G06F 8/443 709/224 |
| 2014/0032531 A1* | 1/2014 | Ravi | ................. | G06F 17/30554 707/722 |
| 2014/0237109 A1* | 8/2014 | Tiger | .................... | H04L 67/025 709/224 |

FOREIGN PATENT DOCUMENTS

EP 2592780 A2 5/2013

OTHER PUBLICATIONS

Per Persson et al., Calvin—Merging Cloud and IoT, 6th International Conference on Ambient Systems, Networks and Technologies, ScienceDirect, Procedia Computer Science 52 (2015), pp. 210-217.
(Continued)

*Primary Examiner* — Padma Mundur
(74) *Attorney, Agent, or Firm* — Leffler Intellectual Property Law, PLLC

(57) ABSTRACT

The present disclosure relates to methods of metering, and in particular to methods of metering activities of applications in distributed networks. More particular, the disclosure concerns a method for metering the operation of distributed Internet of Things, IoT devices. This disclosure relates to a method for metering activities of an application in a data processing system, wherein said data processing system comprises resource nodes configured to perform activities executed as actors in the respective resource nodes; and wherein the actors are controlled by one or more runtimes in the data processing system. The method comprises tracing, by a runtime, information related to activities executed by actors controlled by the runtime, and metering, by the runtime, the operation of the application based on the part of the traced information, which is related to activities of actors being used by the metered application. Furthermore, the
(Continued)

disclosure relates to corresponding apparatuses and computer programs.

14 Claims, 7 Drawing Sheets

(51) Int. Cl.
    *H04W 4/70*     (2018.01)
    *H04L 12/26*     (2006.01)
    *G06F 11/34*     (2006.01)
    *H04L 12/28*     (2006.01)
    *H04L 12/46*     (2006.01)
    *H04M 17/00*     (2006.01)
    *H04W 4/24*     (2018.01)
    *H04L 29/08*     (2006.01)

(52) U.S. Cl.
    CPC ...... *H04L 12/1435* (2013.01); *H04L 12/1496* (2013.01); *H04L 12/28* (2013.01); *H04L 12/4625* (2013.01); *H04L 43/0817* (2013.01); *H04M 17/00* (2013.01); *H04M 17/35* (2013.01); *H04W 4/24* (2013.01); *H04W 4/70* (2018.02); *H04L 67/12* (2013.01)

(56) References Cited

OTHER PUBLICATIONS

PCT International Search Report, dated Jul. 19, 2016, in connection with International Application No. PCT/EP2015/075536, all pages.
PCT Written Opinion, dated Jul. 19, 2016, in connection with International Application No. PCT/EP2015/075536, all pages.
Dominik Charousset et al., CAF—The C++ Actor Framework for Scalable and Resource-efficient Applications, Programming Based on Actors Agents & Decentralized Control, New York, New York, USA, Oct. 20, 2014, pp. 15-28.
Oracle: Java VisualVM—Profiling Applications, Sep. 7, 2015, retrieved from internet Jun. 29, 2016, pp. 1-4.
Per Persson et al., Calvin—Merging Cloud and IoT, ScienceDirect, Procedia Computer Science 52 (2015) 6th International Conference on Ambient Systems Networks and Technologies (ANT 2015), pp. 210-217.

* cited by examiner

MANAGING METERING FOR DISTRIBUTED IOT APPLICATIONS

TECHNICAL FIELD

The present disclosure relates to methods of metering, and in particular to methods of metering activities of applications in distributed networks. More particular, the disclosure concerns a method for metering the operation of distributed Internet of Things, IoT, devices. Furthermore, the disclosure relates to corresponding apparatuses and computer programs.

BACKGROUND

Internet-of-things, IoT, a term that encompasses machine-type communication, MTC, communication and large chunks of cloud services, as well as personal technology such as wearables, smart homes, and mobile phones, is a subject for which the interest and common awareness has exploded in recent years. There are several examples of working applications and devices, particularly in the MTC segment, now being deployed. The benefits of an electricity or water metering device reporting readings directly to the operator, rather than requiring a visit by a meter maid, is obvious. As more and more "things" become connected there is an opportunity to build appliances that involves several of these things in constellations that perhaps was not even envisioned when they were bought as individual devices.

Typically, there are several stakeholders in an IoT/Cloud application, such as a device manufacturer, one or more parties owning IP related to device functionality, device owners, cloud service provider(s), transport providers (telecom operator, ISP, etc.), application developers and end users.

In existing solutions, a device manufacturer typically licenses functionality from IP owners before selling the device. End users pay for devices, either in full, or via subscription contracts running over a period of time. The transport necessary for communication within an application is usually handled by a separate subscription to a separate party, such as a telecom operator. The application is then purchased or, again, subscribed to, by the end user. Should the end user decide to stop using the application, there are several subscriptions to cancel, with several different parties, and some of those may be difficult (or impossible) to cancel before a set period of time.

The software industry is moving towards subscription and pay-per-use models, rather than up-front payment for software and services. These models have successfully been applied to cloud services, but it is less clear how to apply pay-per-use strategies to the emerging Internet-of-Things (IoT) market which is expected to have a value of between $1.9 trillion and $7.1 trillion by 2020 according to Gartner and IDC, respectively.

A major problem with the existing solutions is a 'stove-pipe-like' design where all devices connect to cloud services, either directly or via a gateway device.

As an example, an end user typically must pay in full for a new device, pay for an application to run on the device, sign up for a cloud service subscription, and pay an operator a monthly fee for data traffic between the device and the cloud service.

In a system that consists of components from various vendors, it is technically challenging to measure how much "use" each application actually gets. It requires careful planning and system integration when designing the appliance. Adding new components afterwards, or allowing individual components to take part in multiple separate appliances, will increase the complexity of metering even further. In practice, it becomes so difficult that it is not being done at all.

Consequences of the current approach includes vendor lock-in effects, little room for innovation on top of the solutions, stale applications (because one-off solutions are expensive to maintain and develop further), and unclear role separation between operators, device vendors, service providers, application developers and end users.

Hence, there is a need for improved methods of metering operation of applications, suitable for applications in distributed systems.

SUMMARY

It is the intention of this disclosure provide a technical solution that allows for detailed metering of the total amount of usage for any specific functionality within a system that consists of several distributed components, each implementing some part of the full appliance. The components can be either physical (for instance, a light bulb, a temperature sensor, or a surveillance camera) or software based services (e.g., a database, a face recognition service, or a control algorithm for regulation of indoor climate). The proposed technique facilitates business models based on pay-per-use for some or all functionalities that constitute an appliance. A service provider may chose to provide the physical hardware that is needed for implementing some functionality for free while charging for the consumption or use of it. In other words, the disclosure proposes a method that allows for the charge to be based on different criteria, e.g., total time of use, number of invocations, amount of data processed, et cetera.

This disclosure relates to a method for metering activities of an application in a data processing system, wherein said data processing system comprises resource nodes configured to perform activities executed as actors in the respective resource nodes; and wherein the actors are controlled by one or more runtimes in the data processing system. The method comprises tracing, by a runtime, information related to activities executed by actors controlled by the runtime, and metering, by the runtime, the operation of the application, based on the part of the traced information, which relates to activities of actors being used by the metered application.

By extending the runtime functionality to not only control the actor activities, but to also trace them, it will be possible to meter the use of physical devices, without any changes or additions in the actual devices, as the metering takes place in the updated runtime. The metering in turn allows operators to free developers, device vendors, and service providers from handling billing multiple parties.

According to some aspects, the method comprises reporting the information related to activities executed by actors controlled by the runtime to a runtime manager. According to some aspects, the runtime runs in a resources node, a gateway, or in a network node in the data processing system, or a cloud server. In other words, runtime management can be handled by different entities, e.g. a device owner, the equipment or network operator, or a combination thereof.

According to some aspects, the information defines which actions have been executed and the number of times that the actions have been executed. According to some aspects, the method comprises generating metadata associated with the activities, and the the metering is further based on the generated metadata. According to some aspects, the metadata comprises at least one of time, location or external conditions related to the activities; application ID of the application using the actions and the size of the data transferred between the runtime and the respective actor. Hence, metering may be even more specific, as in may take into account other parameters.

According to some aspects, the functionality executed by the actors is encapsulated and wherein the runtime is configured to handle encapsulated functionality. Thereby, the metering may be done without exposing the functionality, whereby customer integrity is kept.

According to some aspects, the disclosure relates to method, performed in a runtime manager, of metering the operation of an application. The method comprises receiving, from one or more runtimes, information about activities of actors controlled by the respective runtime, and metering the operation of the application based on the part of the received information, which is related to activity of actors that are used by the metered application.

According to some aspects, the method comprises receiving, from the one or more runtimes, metadata associated with the activities of the actors, and then the metering is further based on the generated metadata.

According to some aspects, the disclosure relates to an apparatus configured for metering activities of an application in a data processing system, wherein said data processing system comprises resource nodes configured to perform activities executed as actors in the respective resource nodes. The apparatus comprises one or more memories comprising computer readable code; and one or more processors. The processors are configured to, in response to execution of the computer readable code, using a programming model comprising actors executing activities in the resource nodes and one or more runtimes for controlling the actors, trace, by a runtime, information related to activities executed by actors controlled by the runtime, and meter, by the runtime, the operation of the application based on the part of the traced information which is related to activities of actors being used by the metered application. The apparatus is further configured to perform all the aspects of the method for metering described above and below.

According to some aspects, the disclosure relates to a runtime manager configured for metering the operation of an application in a data processing system, wherein said data processing system comprises resources node configured to perform activities executed as actors in the respective resources nodes. The runtime manager comprises one or more memories comprising computer readable code; and one or more processors. The processors are in response to execution of the computer readable code, using a programming model comprising actors executing activities in the resource nodes and one or more runtimes for controlling the actors, configured to receive, from one or more runtimes, information about activities of actors controlled by the respective runtime, and to meter the operation of the application based on the part of the received information, which is related to activity of actors that are used by the metered application. The runtime manager is further configured to perform all the aspects of the method for metering described above and below.

According to some aspects, the disclosure also relates to a computer program comprising computer program code which, when executed in an apparatus, causes the apparatus to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
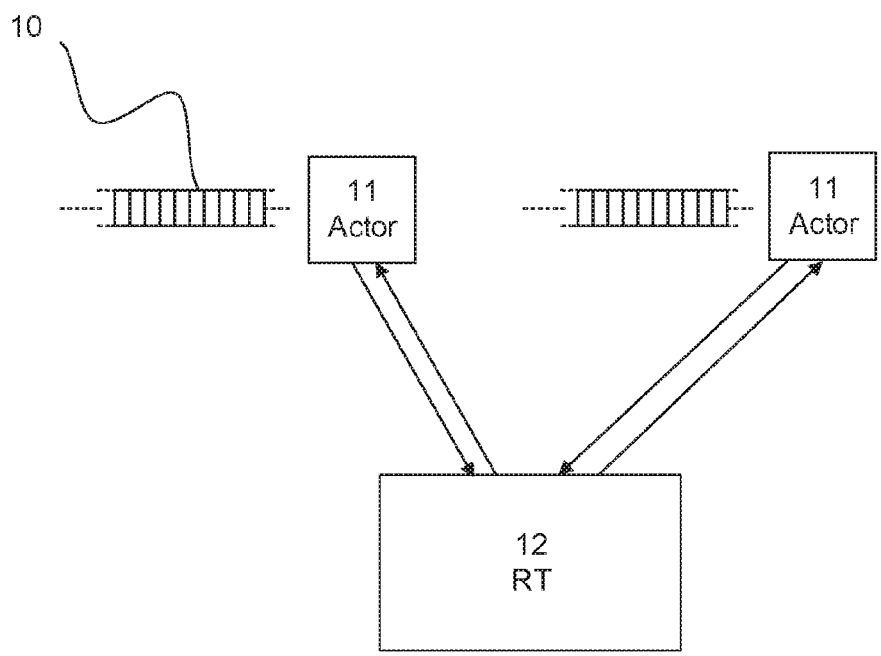
FIG. 1 illustrates the operation of runtimes and actors in an actor model.

Aspects of the present disclosure will be described more fully hereinafter with reference to the accompanying drawings. The methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It is appreciated that the different Figures may comprise some operations which are illustrated with a solid border and some operations which are illustrated with a dashed border. The operations which are comprised in a solid border are operations which are comprised in a broader example embodiment. The operations which are comprised in a dashed border are example embodiments which may be comprised in, or a part of, or are further operations which may be taken in addition to the operations of the solid border example embodiments. It should be appreciated that the operations need not necessarily to be performed in disclosed order if not stated otherwise in this disclosure. Furthermore, it should be appreciated that not all of the operations need to be performed. The example operations may be performed in any suitable order and in any combination of the illustrated embodiments in the Figures.

This disclosure intends to show how the roles of the various resources involved can be made clear to allow for precise metering—in arbitrary meaningful metric(s)—of resource utilization in terms of power, computations, data traffic, number of uses and/or time. The proposed techniques makes it possible to build business models where actual utilization is measured and paid for rather than a one-time or recurrent fee for the ability to use the resource.

The technique may also make it possible to identify devices used more frequently than normal/planned and, e.g., schedule maintenance at shorter interval, install additional devices to off-load traffic or use. This applies e.g. to lightbulbs and automatic door opener.

Another possibility is to identify infrequently used devices and, e.g., move them to different locations to get better utilization. This applies e.g. to vending machines and ATMs.

It is also possible to use the metering for analytics. The data flows through a system and may be processed differently depending on the data values. Thus, counting the number of invocations of certain actions within actors of interest could give an insight to the frequency of occurrence of certain values within a data stream. This information can be useful information when designing efficient applications.

With the technical solution that is proposed, devices and services from different vendors can be combined in arbitrary constellations while retaining the possibility to extract the resource utilization for the individual components in the combined appliance. It will also facilitate scenarios where a particular device concurrently is an integral part of separate appliances, while the metering of its usage can easily be kept individual for each of the different appliances.

The basic idea of this disclosure is a dataflow based processing environment that has been extended with the ability to log and keep track of the usage of well-defined entities within user programs. The data flow based programming environment uses an actor model. An actor model is a general model of concurrent computation, that treats "actors" as the universal primitives of concurrent computation: in response to a message that it receives, an actor can make local decisions, create more actors, send more messages, and determine how to respond to the next message received. Data flow based programming environments and actor models are commonly known within the art of computer programming.

A simplified skectch of an actor model can be found in FIG. 1. When using an actor model, applications are defined as data flow graphs with actors 11, encapsulating functionality, reacting to incoming data in the form of tokens 10. Actors may also react to external events such as timers, 1O interrupts, or other events coming from the environment via the event specific API.

Incoming tokens 10 cause actions to be performed in the actor 11, referred to as an actor firing. Actors execute on runtimes 12, which means that wherever an application can run its constituent actors—be it on a device, a gateway, a network node, or a cloud server—someone has deployed a runtime, and that someone could be the end user, an operator, a network operator, or a cloud provider.

In this application an actor is defined as a software entity or dedicated hardware with an interface defined by optional incoming ports, optional outgoing ports, and an internal state, which may be empty. An actor can react to data (tokens) arriving on one or more incoming ports, an external event when notified by the runtime hosting it, and the availability of room for more tokens on one or more outgoing ports. Internally, an actor has one more more actions, and reacting for an actor means one or more of its actions fire, i.e., it (or they) will be run.

In this application a runtime is defined as a computer program or dedicated hardware which can host one or more actors, with actor as described above. By hosting an actor, it is assumed the runtime can 1) accept incoming tokens originating from actors hosted on the same or another runtime, routing the tokens to one or more destination actors, as defined by the application data flow graph, and 2) route any tokens originating from actors it is currently hosting to actors either hosted on the same runtime or a different runtime. 3) A runtime has information on all actions of an actor and once the conditions of an action to fire are satisfied, the runtime executes the action.

This application generally refer to devices or resource nodes. A resource node refers to any device that provides functionality (or resources) that may be used by an application. For example IoT devices, like sensors, or processors. Hence, a resource node is defined as a device or apparatus comprising one or more resources.

One particular framework with the necessary means is the open source framework Calvin, see "Calvin—Merging Cloud and IoT", by Per Persson, Ola Angelsmark, Procedia Computer Science, Volume 52,2015, Pages 210-217.

For better understanding of the proposed technique Calvin will now be described in further detail. Note however, that Calvin is just one example of a framework that could be used for implementing the technology described herein.

Calvin is a framework that may be used for developing applications for IoT and Cloud, which may otherwise be difficult even without considering the inherent complexity of distributed computing as there are several competing platforms, programming languages and communication protocols.

Calvin is a hybrid framework combining ideas from the Actor model and Flow Based Computing. When using Calvin, on each device e.g. a sensor device, there is at least one runtime that is capable of handling encapsulated functionality that is part of the dataflow program. Such encapsulated functionality is generally referred to by the well-known term actor. The runtime is a prerequisite for actors to execute; it is the machinery that drives the flow and processing of the data defined by the code that defines an actor.

Figure 2:
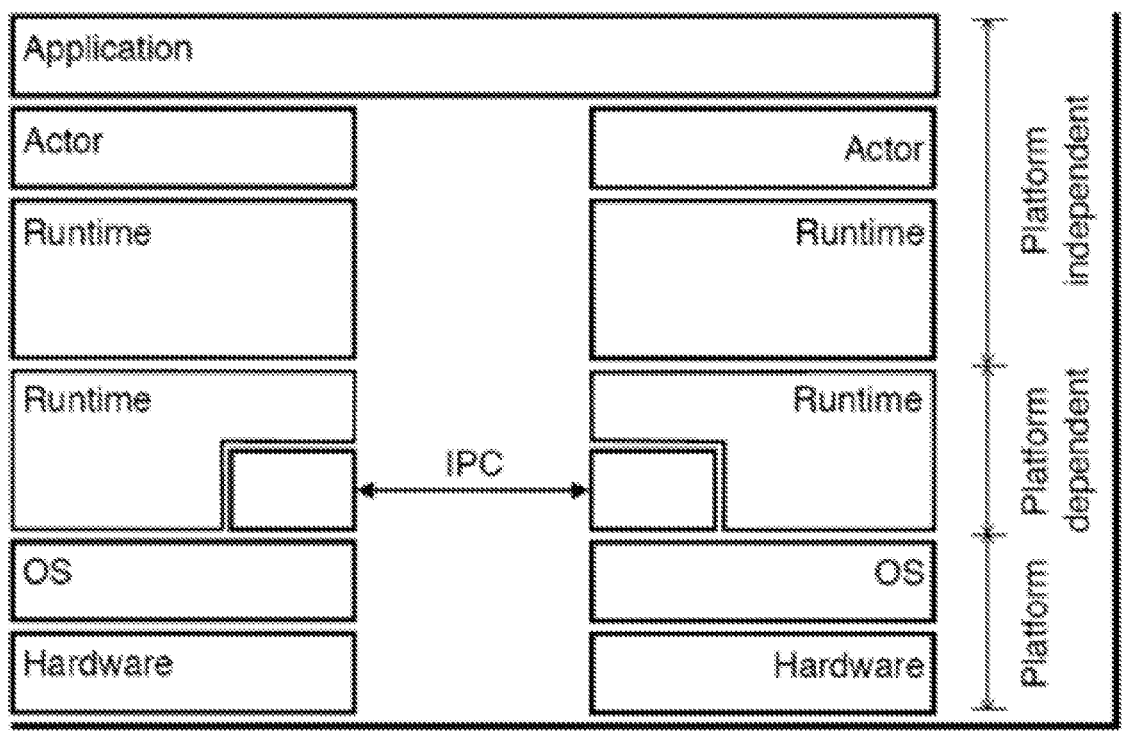
FIG. 2 illustrates the Calvin software stack.

The Calvin software stack, illustrated in FIG. 2, consists of a platform dependent layer handling data transport and presenting the platform specific features like sensors, actuators, and storage in a uniform manner to the platform independent layer that is responsible for runtime coordination, migration decisions, and the API exposed to actors. Many aspects of the runtime are exchangeable through a plug-in mechanism. This means that we can switch to an entirely different scheduler with different properties, or, to a scheduler that bahaves similarly but is extended in some way.

Starting from the bottom, there is hardware, the physical device or data center, and the operating system (OS) it exposes Common operating systems (OS) include, but are not limited to, Linux, Windows, Mac OS X. Together, the hardware and OS constitute a platform for the runtime, and on top of this resides the platform dependent part of Calvin. If there is a separate OS; then Calvin would commonly run on top of it. However, for smaller platforms where there is no or only a rudimentary OS, Calvin can be viewed as part of the OS. For example a Calvin port to e.g. micro-controllers could be done without OS support at all.

Here communication between runtimes of different physical devices is handled, and through a plug-in mechanism any kind of transport layer (WiFi, BT, i2c) and protocol is supported, including efficient implementation of data transport between actors sharing the same runtime. This is also where inter-runtime communication and coordination takes place. This layer also provides an abstraction of platform functionality, such as I/O and sensing capabilities, to the higher levels of the runtime in a uniform manner. Again, the actual algorithms controlling the behavior use a plug-in mechanism for flexibility and extensibility.

Above the platform dependent level of the runtime there is the platform independent runtime layer, providing the interface towards the actors. This is where e.g. the scheduler resides, a key component of the Calvin runtime. Since it has impact on things like latency and throughput, it too is extensible. On top of this, in the uppermost layers, are the actors and the applications built from actors.

Not shown in FIG. 2 are the connections between actors as prescribed by the application. This is because the connections are logical, and where the actors reside is decided by the runtimes, and data transport is provided by the runtimes. It is important for the migration functionality that actors are unaware of their actual location. They only know that their location requirements, if any, are satisfied.

A Calvin runtime is inherently multi-tenant. Once an application is deployed and actors are migrated according to requirements and constraints, they may (and will) share runtimes with actors from other applications. The runtime can be configured to grant different access to resources depending on which application an actor is part of (or rather the access level of the user running the application.) There are a number of possible ways of implementing this, but at its simplest, a runtime may be divided into a "private" part with full access, and a "public" part with limited access.

Note that Calvin is used herein as an example, to describe the underlaying principle of an actor based model where applications share actors and runtimes.

Figure 3:
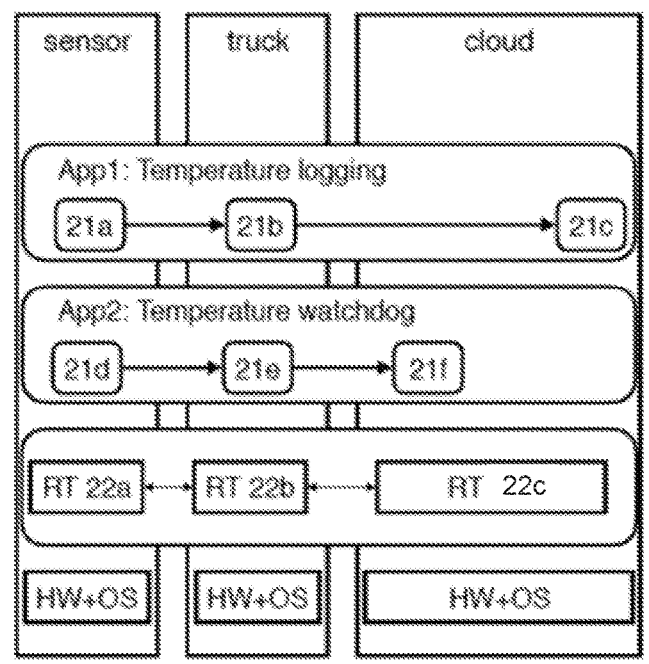
FIG. 3 shows a distributed execution environment.

In FIG. 3 a distributed execution environment formed by a mesh of runtimes 22a, 22b, 22c is seen by the applications App1, App2 as a single platform. The applications App1, App2 are transparently distributed across the network, consist of actors A1-A6 representing resources such as devices, compute nodes, and storage nodes. Sometimes the term applicance is used, which by definition is a distributed application that may span over several devices.

With the Calvin framework in place, it is possible to view all the available physical devices of a framework as components of a generic compute platform that can be used for arbitrary applications.

By this architecture, a sensor is no more only a dedicated resource of a specific vertical appliance. Instead, it is a resource that is ready for use by anyone (with credentials) in need of this particular sensor. The same goes for other hardware components connected to the distributed Calvin runtime.

As stated above, Calvin is just an example of a framework for implementing the proposed techniques. The technical properties of Calvin that may be relevant to the proposed technique are that:
  A runtime can handle several concurrent actors that can be used by several applications.
  The runtimes may track metadata without the need to know about actual content or operations of user data.
  Metadata, such as time stamps, location information, amount of consumed or processed data, data movement and type of operations on data, can be associated with the usage of individual actors.
  The metadata can be generated and kept track of with high resolution by the runtime.

One of the key features of a data flow based programming environment is that actors do not share their state with anyone or anything. At first glance, this might seem like a problem if one would like to meter specifics relating to the activities of an actor. However, the inventors have realized that actors can supply quite fine-grained information about what actor fired which action and when (time-stamp) it fired, the size of the tokens consumed and produced, and the identity of the application that actor belongs to. In principle, any other type of information can be added to the metadata if it is desirable and the necessary support for generating the information is there. Examples of such information can be the physical location of the actor (or, to be more precise, of the runtime on which the actor runs); status information relating to the device on which the actor is deployed, such as processor load, number of concurrent runtimes, or battery charge; external conditions that might influence the appliance, such as temperature, humidity, et cetera.

In a data flow based programming environment it is the runtime that keeps track of metadata related to actors. Thus, the entity that manages a runtime will have access to all the metadata. By collocating or tracing metadata information, over time, from different runtimes hosting actors of an application, a detailed and fine-grained tracing of the activities is possible. Based on this material, the runtime manager can deduct which actor executed and at what time, how much data was processed and by whom. Thus, it is a simple matter of combining this information with an appropriate pricing policy to build a pay-for-use business model.

Generating metadata for an actor does not require any knowledge of what the application it is part of does, what kind of data is being processed or what operations are performed, nor on behalf of whom the application is being run. This is an essential property as it makes it possible to meter without risking the confidentiality of the data that is processed by the actor.

Example Operations

Figure 4:
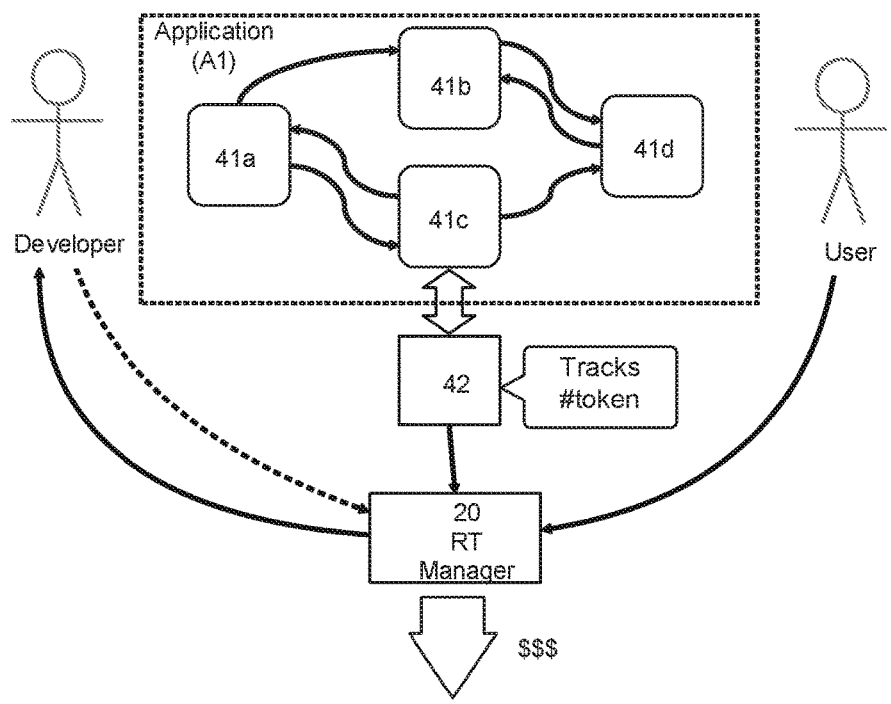
FIG. 4 illustrates how micropayments based on actual use of an application or resource can be managed.

FIG. 4 illustrates an example scenario, in a distributed data processing system, comprising devices such as IoT devices remotely distributed across a network. In the scenario a developer develops an application and sets a price for the user based on #tokens, data volume, #transactions, latency, throughput, QoS, etc.

Then a user starts using pay-per-use service (could be a lightbulb, free to pick up, pay-per-use). The proposed technique allows the operator to meter the activities of the application, without understanding or even having access to the application.

Figure 5:
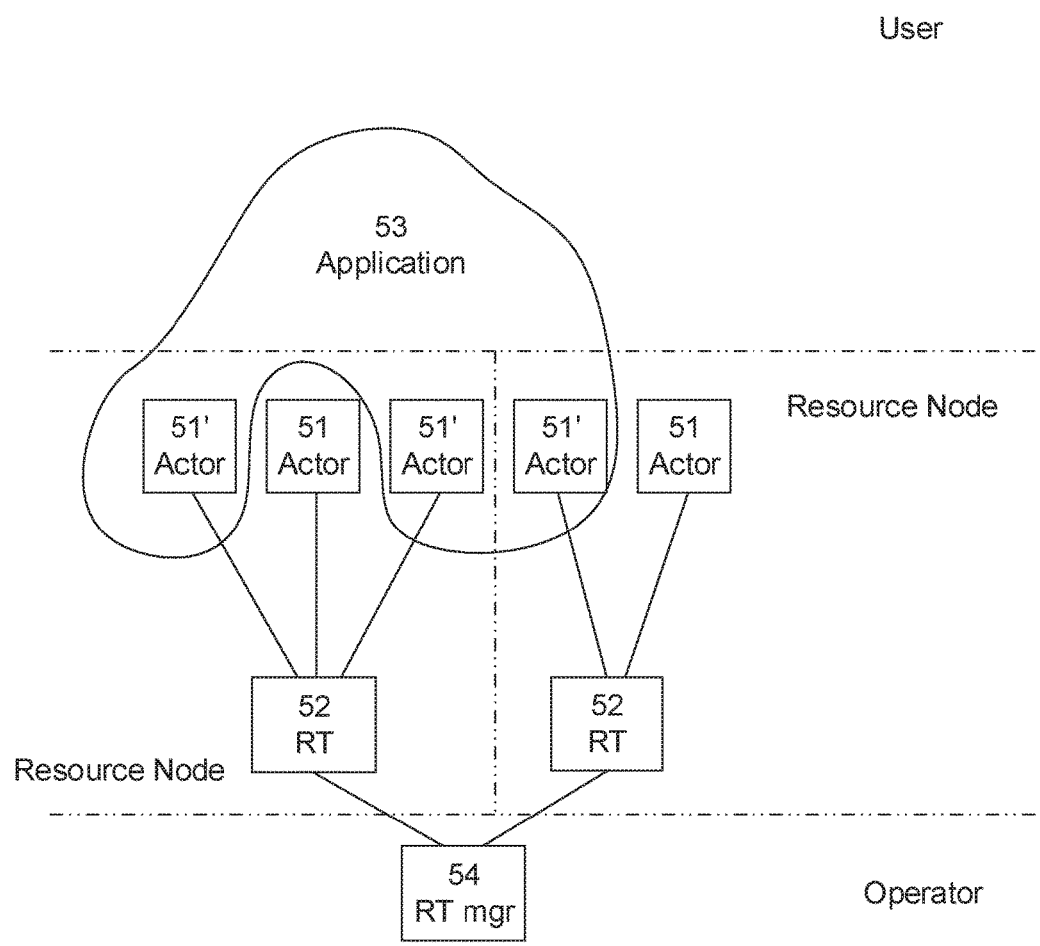
FIG. 5 illustrates a distributed execution environment using an actor model in more detail.
Figure 6:
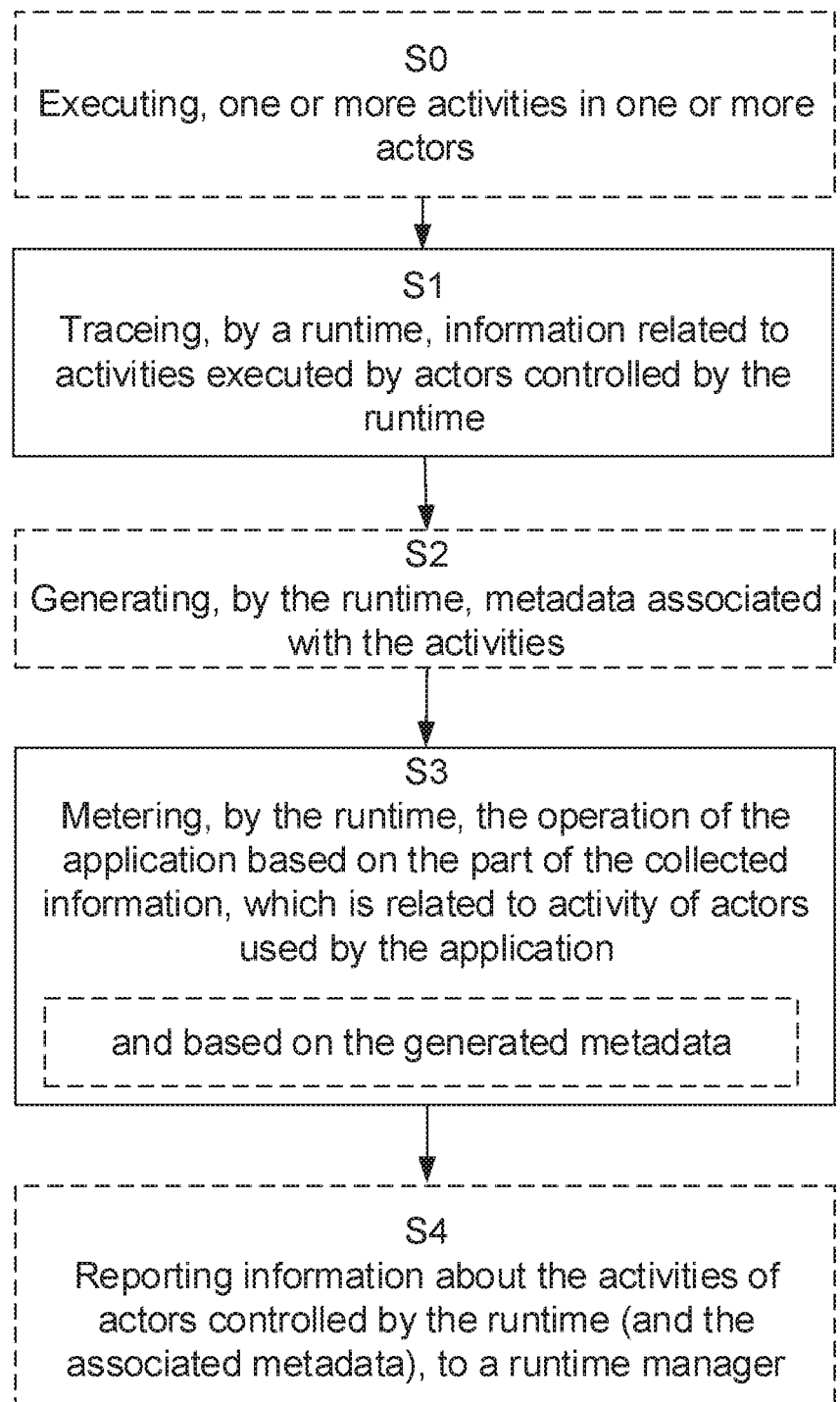
FIG. 6 shows a flow chart illustrating method steps performed by a runtime.

The example operations performed by a runtime extended with the ability to log and keep track of the usage of well-defined entities within user programs will now be described referring to FIG. 5 showing a distributed execution environment using an actor model in more detail and FIG. 6 showing example operations performed by a runtime.

FIG. 5 illustrates an application 53 e.g. an application for private use in a mobile phone, producing tokens to actions executed by three different actors 51', e.g. being sensor devices. At each actor incoming tokens are queued. The queued tokens are executed by runtimes 52. This implies that the runtimes knows which actions have been fired and how many times. The runtimes can also derive information about when they were fired and the amount of data of the runtime. The runtimes can runs in a resources node, a gateway, or in a network node in the data processing system, or a cloud server. In the example of FIG. 5 the runtimes run in the resource nodes.

Now turning to FIG. 6, disclosing a method performed by a runtime, for metering activities of an application in a data processing system comprising devices configured to perform activities executed as actors in the respective devices. The resource nodes comprises resources e.g. sensors, compute nodes, and storage nodes. The actors control the resources. That the actors run in the resource nodes does not nessesarily mean that the code in implemented in the actual resource node, the actos may as well run in any node being connected to the resource nodes. The actors are controlled by one or more runtimes in the data processing system.

According to some aspects, the functionality executed by the actors involve operation on data and/or utilization of resources.

The method is according to some aspects initialized by the runtime executing S0 one or more activities in one or more actors. In other words, incoming tokens from the application causes actions to be fired by the actors. One example of an action is a sensor performing a measurement.

In accordance with the proposed methods the runtime not only executes the operations of the actions, but it also S1, information related to activities executed by actors controlled by the runtime. Tracing implies that the runtime obtains (or collects) and stores information about the executed activities. In other words, the runtimes functionality is extended not only to execute the actions, but also to keep track of information such as statistics related to the execution. This is typically done without analyzing the action, while may in the simplest form only require tracing which actions have been fired and how many times. Stated differently, the traced information may define which actions have been executed and the number of times that the actions have been executed. According to some aspects, the functionality executed by the actors is encapsulated. This implies that the runtime is configured to handle encapsulated functionality, which implies that no access to the data is required.

The runtime may also generate additional data related to the fired actions such as time, temperature, external conditions, amount of data etc. Hence, according to some aspects of this disclosure, the method comprises generating S2, metadata associated with the activities. According to some aspects, the metadata comprises at least one of time, location or external conditions related to the activities; application ID of the application using the actions and the size of the data transferred between the runtime and the respective actor. If metadata is also traced, then the metering is further based on the generated metadata.

The disclosure proposes metering S3 the operation of the application based on the part of the traced information, which is related to activities of actors being used by the metered application. Metering e.g. implies calculating how many times certain operations have been performed. The metering may e.g. imply calculating the number of times a certain algorithm has been executed. The runtime knows which actors have been executed and by whom (which application), so it may e.g. calculate the total resource use of one certain application.

In another example one may meter how long a certain machine has been powered on. This may be accomplished by determining the time of the firing of actions "power on machine A" and "power off machine A". Based on this information service schedules etc. may be created.

The metering may be done, at least partly, in the runtime. Alternatively each runtime may forward the traced information to a central unit, here referred to as a runtime manager. Hence, according to some aspects the method further comprises reporting S4, the information related to activities executed by actors controlled by the runtime, to a runtime manager.

Figure 7:
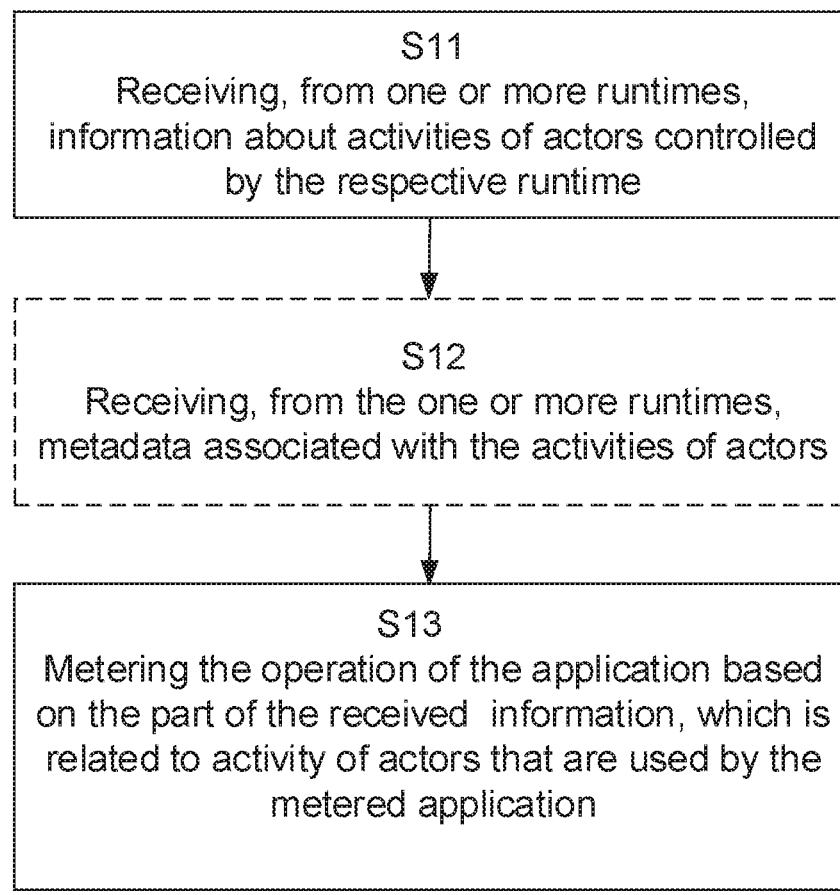
FIG. 7 shows a flow chart illustrating method steps performed by a runtime manager.

A method performed in a runtime manager of metering the operation of an application, will now be described, turning to FIG. 7, disclosing a method in a runtime, for metering activities of an application in a data processing system comprising devices configured to perform activities executed as actors in the respective devices.

The method in a runtime manager comprises receiving S11, from one or more runtimes, information about activities of actors controlled by the respective runtime. The method then comprises metering S13 the operation of the application based on the part of the received information, which is related to activity of actors that are used by the metered application.

According to some aspects, the information defines the number of times that the actions have been executed.

According to some aspects, the method comprises receiving S12, from the one or more runtimes, metadata associated with the activities of actors. Then the metering is further based on the generated metadata. According to some aspects the metadata comprises at least one of time, location or external conditions related to the activities and application ID of the application using the actions.

Example Implementation

One example of a situation where the proposed methods may be useful is in a conventional application in an access control system where a surveillance camera is monitoring access to a building. Whenever someone attempts to enter the premises, an application acquires an image of that person using a first actor in a camera and sends the image to a second actor that is performing face recognition. Depending on the outcome of the face recognition action will open a lock (or keep it locked).

In the first stages of processing face detection actor is used to select images for further processing. This is a fairly simple operation that is likely running on the camera. If a face is detected, it is sent to the face recognition actor which is a much more complex task best run somewhere in the cloud. Finally, if the face recognition turns up favourably (for the person trying to enter the building) a signal is sent to unlock the door.

Firstly, the face recognition service is considered. The service provider sells the service "does this face belong to someone in our employee database", charging a fixed (small) amount for each image of a face it examines. This is not entirely different from an ordinary cloud service, save for the pricing model. The really interesting things happen when looking at the surveillance camera and the door. The surveillance camera is run by its manufacturer, and the door is run by the facility management operator. Both items are owned, installed, and maintained by 3rd parties, and carries no fixed cost but instead the user the system is charged a small fee on every image passed from the camera to the face recognition service, and every time the door is unlocked. The application developer, again, is also paid based on the number of access attempts, successful or not.

The problem here is of course to manage the financial transactions. Even for this simple application, there are five parties involved: the application developer/system integrator, the user of the system, the surveillance camera manufacturer, the cloud service provider, and of course, the door's owner. The proposed methods facilitate pricing in these situations as the runtime controlling the face recognition operation may trace the number of face recognitions performed by specific operations.

Another example is a pay-per-use light bulb. In general people are accustomed to pay for electricity as using it. Switching on the lights means paying for the use of electricity, switching off the light means stop paying. With this solution a connected light bulb such as the Philips Hue can now be free to pick up at the store, but if it is switched on the provider will charge a fee. This may be done by a runtime in connection to the light bulb tracing the operations of switching on and of the light and corresponding time stamps. Thereby, billing of the actual use can be handled through the electricity company, just like a bill for electricity.

For example, with large installations of lights, e.g. Christmas lights in a city, or lightning in a sports arena, currently visual inspection is used in order to keep track of lights that need replacing. Assuming each light has an actor, if a runtime notices that an actor produces no output for an extended period of time, it could be possible to deduce that a light is broken.

In another example, a particular mechanical door lock needs to be serviced every 10,000 openings. By having the runtime notifying either an administrator, or a service technician directly, when the number is approaching, it is possible to avoid unnecessary service (due to scheduling service too early) and problems caused by late service. In this scenario, the owner of the door lock would benefit from both cases.

Figure 8A:
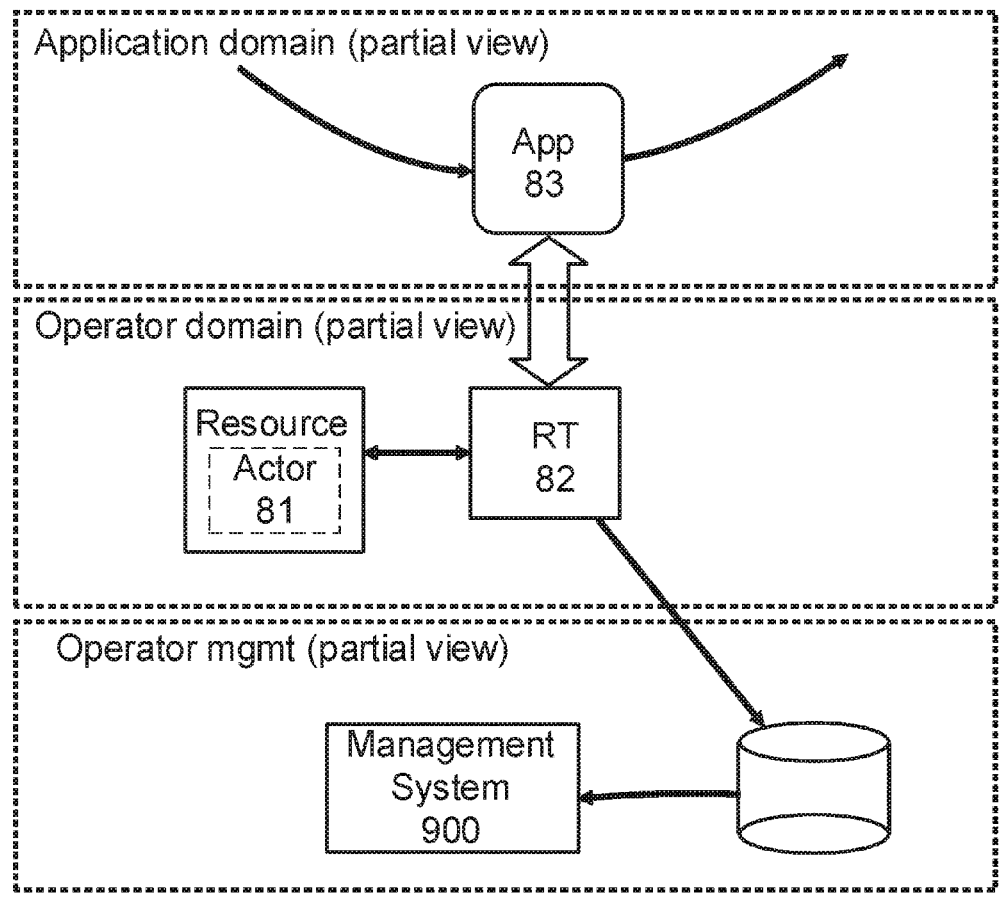
FIG. 8a shows an overview of metering using the proposed technique.

With reference to FIG. 8a, one example situation where the proposed technique may be used is when a user application performs operations on data, or utilizes resources supplied by one or more "operators". Operator is used in a generalized sense here, not as in "telco operator", but as any service provider. In FIG. 8a a user holds an application 83 that needs access to a resource such as a sensor. A runtime 82 is typically implemented in the resource node. The runtime controls the operations of actions (executed by actors 81 of the resource) in the resource node e.g. an IoT device (here referred to as a resource node).

This disclosure proposes that the runtime 82 does not only control the operations of actions, but it also keeps track of the number of operations performed by the IoT device(s) (e.g. face recognitions), data volumes (tokens), and resource utilization (e.g. a light bulb or a licensed media codec). The runtime then reports the numbers to a management system 900 (also referred to as a runtime manager) that handles e.g. billing of user and payments to involved parties, or notifying the owner or a service partner to schedule service based on usage.

Node Configuration

Figure 8B:
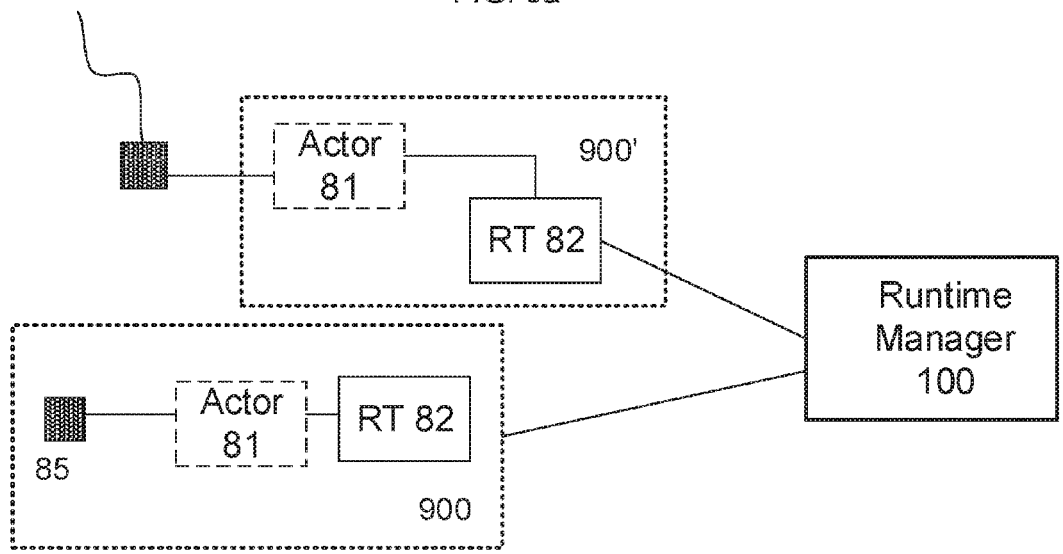
FIG. 8b shows an overview of the components of a system where the proposed technique is implements.

FIG. 8b illustrates a system where the proposed methods are implemented. The system comprises two apparatuses 900, 900' configured for metering activities of an application in a data processing system and sensor devices 85 (referred to as resources 85) whose activity are to be metered. The actors 81 performs actions e.g. measurements. As discussed above a runtime may be included in the sensor device (as apparatus 900) or the actor and the resource node may be separate from the sensor and running on a separate server or device (i.e. the resource node), as in apparatus 900'. The example of FIG. 8b also comprises a runtime manager 100 that is assisting in the metering. Hence, the apparatuses 900, 900' are configured to communicate with the runtime manager.

Figure 9:
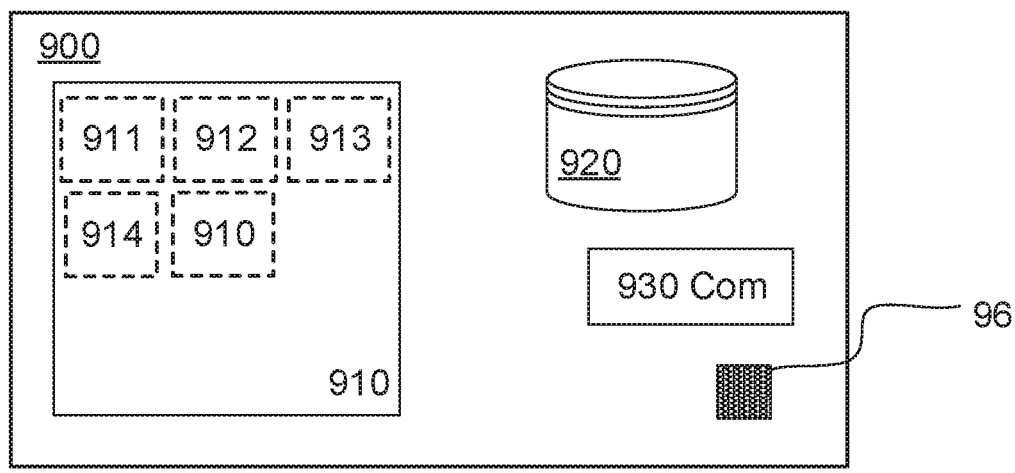
FIG. 9 illustrates an example node implementation of a runtime.

Now turning to FIG. 9 illustrating an example node implementation of an apparatus 900 configured for metering activities of an application in a data processing system. Said data processing system comprises resources nodes configured to perform activities executed as actors in the respective resources nodes. As mentioned above, according to some aspects, a runtime is implemented in the respective resource nodes. Hence, the apparatus 900 may be the resource node, but should not be restricted thereto.

However, the runtime does not necessarily have to execute on the resource node—it suffices that the runtime is controlling relevant parts of the communication with the resource node, e.g. over an interface. Relevant, in this case, means communication resulting e.g. in billable actions, see the runtime apparatus 100' in FIG. 8b.

The apparatus comprises one or more memories comprising computer readable code; and one or more processors in response to execution of the computer readable code.

The memory 920 may be configured to store data and/or executable program instructions. The memory 920 may be any suitable type of computer readable memory and may be of volatile and/or non-volatile type. According to some aspects, the disclosure relates to a computer program comprising computer program code or instruction sets which, when executed in an apparatus, causes the apparatus to execute any aspect of the example node operations described below. According to some aspects, the disclosure relates to a computer program comprising computer program code or instruction sets which, when executed in an apparatus, causes the apparatus to execute any aspect of the example node operations described below.

The processing circuitry 910 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. The processing circuitry is further adapted to perform all the aspects of the method in an apparatus described above and below.

When run, the computer readable code forces the apparatus to, using a programming model comprising actors executing activities in the resource nodes and one or more runtimes for controlling the actors, trace, by a runtime, information related to activities executed by actors controlled by the runtime, and to meter, by the runtime, the operation of the application based on the part of the traced information, which is related to activities of actors being used by the metered application. If the apparatus 900 is the resource node, then it also comprises a resource such one or more sensor elements, processing units etc.

According to some aspects the apparatus comprises a communication interface 930, which may also be denoted e.g. Input/Output (I/O) interface, includes a network interface for sending data to and receiving data from other apparatuses and network nodes.

Functionalities of the receiving node are implemented as software, hardware or combinations thereof. For example, communication functionality may comprise hardware components like memories, units for discrete Fourier transforms, modulators, amplifiers, filter and processing units but also software components, e.g. encoders.

According to some aspects the apparatus or the processing circuitry comprises modules for performing the different steps.

Hence, according to some aspects the apparatus comprises a tracing module 911 configured to trace information related to activities executed by actors controlled by the runtime, and a metering module 913 configured to meter the operation of the application based on the part of the traced information, which is related to activities of actors being used by the metered application.

According to some aspects the apparatus comprises an execution module 910 configured to execute one or more activities in one or more actors.

According to some aspects the apparatus comprises a generation module 912 configured to generate, by the runtime, metadata associated with the activities.

According to some aspects the apparatus comprises a reporting module 914 configured to report, the information related to activities executed by actors controlled by the runtime, to a runtime manager.

Figure 10:
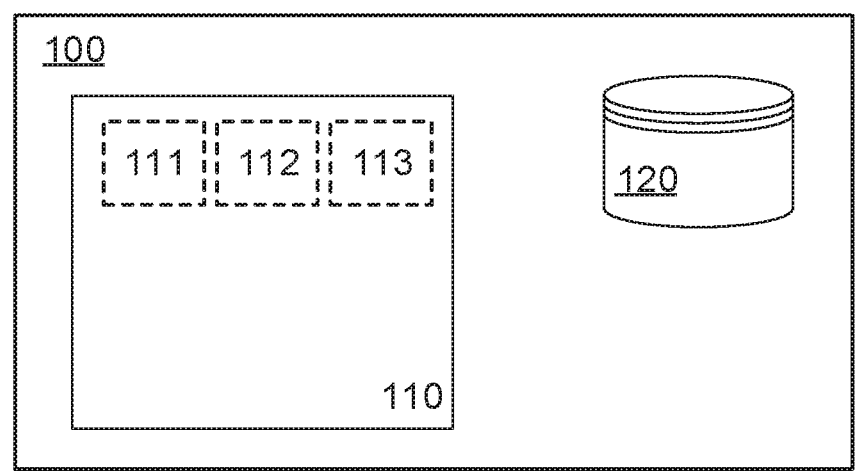
FIG. 10 illustrates an example node implementation of a runtime manager.

Now turning to FIG. 10 illustrating an example node implementation of a runtime manager 100 configured for metering activities of an application in a data processing system, wherein said data processing system comprises resources nodes configured to perform activities executed as actors in the respective resources nodes.

It should not matter where the runtime manager is executing. The only requirement is that it can in some way get information from the runtimes reporting to it.

The runtime manager comprises one or more memories 120 comprising computer readable code; and one or more processors 110 that perform actions in response to execution of the computer readable code.

The memory 120 may be configured to store data and/or executable program instructions. The memory 120 may be any suitable type of computer readable memory and may be of volatile and/or non-volatile type. According to some aspects, the disclosure relates to a computer program comprising computer program code or instruction sets which, when executed in a runtime manager, causes the runtime manager to execute any aspect of the example node operations described below. According to some aspects, the disclosure relates to a computer program comprising computer program code or instruction sets which, when executed in an apparatus, causes the apparatus to execute any aspect of the example node operations described below.

The processing circuitry 1010 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. The processing circuitry is further adapted to perform all the aspects of the method in an apparatus described above and below.

When run the computer readable code forces the runtime manager to, using a programming model comprising actors executing activities in the resource nodes and one or more runtimes for controlling the actors, receive, from one or more runtimes, information about activities of actors controlled by the respective runtime, and to meter, the operation of the application based on the part of the received information, which is related to activity of actors that are used by the metered application.

Functionalities of the receiving node are implemented as software, hardware or combinations thereof. For example, communication functionality may comprise hardware components like memories, FFT units, modulators, amplifiers, filter and processing units but also software components, e.g. encoders.

According to some aspects the runtime manager or the processing circuitry comprises modules for performing the different steps.

Hence, according to some aspects the apparatus comprises a receiver module 111 configured to receive, from one or more runtimes, information about activities of actors controlled by the respective runtime and a metering module 113 configured to meter the operation of the application based on the part of the received information, which is related to activities of actors being used by the metered application.

According to some aspects the apparatus comprises a receiver module 112 configured to receive, from the one or more runtimes, metadata associated with the activities of actors.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

It should also be noted that in some alternate implementations, the functions acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for metering activities of a metered application that is one of a plurality of applications in a data processing system, wherein said data processing system comprises resource nodes configured to perform activities for any one of the plurality of applications, the method comprising:
   executing activities as actors in respective ones of the resource nodes, wherein the actors are fired as a result of execution by any one or more of the applications including the metered application, and wherein the actors are controlled by one or more runtimes in the data processing system;
   tracing, by the one or more runtimes, information related to the activities executed by the actors controlled by the one or more runtimes;
   generating metadata for the traced information, wherein the metadata includes, for each firing of an actor, an application identifier (ID) of the application to which the fired actor belonged at the time of firing; and
   metering, by the runtime, the operation of the metered application based on the part of the traced information that is shown by the application ID in the metadata to be related to activities of actors being used by the metered application.

2. The method of claim 1, wherein the method comprises: executing one or more activities in one or more actors.

3. The method of claim 1, wherein the method comprises: reporting, the information related to activities executed by actors controlled by the runtime, to a runtime manager.

4. The method of claim 1, wherein the information defines which activities have been executed and the number of times that the activities have been executed.

5. The method of claim 1, wherein the metadata comprises at least one of time, location or external conditions related to the activities, and the size of the data transferred between the runtime and the respective actor.

6. The method of claim 1, wherein the functionality executed by the actors involve operation on data and/or utilization of resources.

7. The method of claim 1, wherein the functionality executed by the actors is encapsulated and wherein the runtime is configured to handle encapsulated functionality.

8. The method of claim 1, wherein the runtime runs in a resource node, a gateway, or in a network node in the data processing system, or a cloud server.

9. A method, performed in a runtime manager, of metering the operation of a metered application that is one of a plurality of applications, the method comprising:
   receiving, from one or more runtimes, traced information about activities of actors controlled by the respective runtime, wherein the actors are fired as a result of execution by any one or more of the metered application and at least one other one of the applications;
   receiving, from the one or more runtimes, metadata for the traced information, wherein the metadata is associated with the activities of actors that were fired as a result of execution by the metered application and by the at least one other one of the applications, wherein the metadata includes, for each firing of an actor, an application identifier (ID) of the application to which the fired actor belonged at the time of firing; and
   metering the operation of the metered application based on the part of the received information that is shown by the application ID in the metadata to be related to activity of actors that are used by the metered application.

10. The method of claim 9, wherein the information defines the number of times that the activities have been executed.

11. The method of claim 9, wherein the metadata comprises at least one of time, location or external conditions related to the activities.

12. An apparatus configured for metering activities of a metered application that is one of a plurality of applications in a data processing system, wherein said data processing system comprises resource nodes configured to perform activities for any one of the plurality of applications, the apparatus comprising:
   one or more memories comprising computer readable code; and
   one or more processors in response to execution of the computer readable code, using a programming model comprising actors executing activities in the resource nodes and one or more runtimes for controlling the actors, being configured to:
      execute activities as actors in respective ones of the resource nodes, wherein the actors are fired as a result of execution by any one or more of the applications including the metered application;
      trace, by the one or more runtimes, information related to the activities executed by the actors controlled by the one or more runtimes;
      generate metadata for the traced information, wherein the metadata includes, for each firing of an actor, an application identifier (ID) of the application to which the fired actor belonged at the time of firing; and
      meter, by the runtime, the operation of the metered application based on the part of the traced information that is shown by the application ID in the metadata to be related to activities of actors being used by the metered application; and
      generate metadata associated with the activities.

13. A runtime manager configured for metering the operation of a metered application that is one of a plurality of applications in a data processing system, wherein said data processing system comprises resource nodes configured to perform activities for any one of the plurality of applications, the runtime manager comprising:
   one or more nontransitory memories comprising computer readable code; and
   one or more processors that, in response to execution of the computer readable code, use a programming model comprising actors executing activities in the resource nodes and one or more runtimes for controlling the actors, being configured to;
      receive, from one or more runtimes, traced information about activities of actors controlled by the respective runtime, wherein the actors are fired as a result of execution by any one or more of the metered application and at least one other one of the applications;
      receive, from the one or more runtimes, metadata for the traced information, wherein the metadata is associated with the activities of actors that were fired as a result of execution by the metered application and by the at least one other one of the applications, wherein the metadata includes, for each firing of an actor, an application identifier (ID) of the application to which the fired actor belonged at the time of firing; and
      meter the operation of the metered application based on the part of the received information that is shown by the application ID in the metadata to be related to activity of actors that are used by the metered application.

14. A nontransitory computer-readable storage medium comprising computer program code which, when executed in an apparatus, causes the apparatus to execute a method for metering activities of a metered application that is one of a plurality of applications in a data processing system, wherein said data processing system comprises resource nodes configured to perform activities for any one of the plurality of applications, the method comprising:

executing activities as actors in respective ones of the resource nodes, wherein the actors are fired as a result of execution by any one or more of the applications including the metered application, and wherein the actors are controlled by one or more runtimes in the data processing system;

tracing, by the one or more runtimes, information related to the activities executed by the actors controlled by the one or more runtimes;

generating metadata for the traced information, wherein the metadata includes, for each firing of an actor, an application identifier (ID) of the application to which the fired actor belonged at the time of firing; and metering, by the runtime, the operation of the metered application based on the part of the traced information that is shown by the application ID in the metadata to be related to activities of actors being used by the metered application.

\* \* \* \* \*